United States Patent [19]

Sumerak

[11] Patent Number: 5,556,496
[45] Date of Patent: Sep. 17, 1996

[54] PULTRUSION METHOD FOR MAKING VARIABLE CROSS-SECTION THERMOSET ARTICLES

[76] Inventor: Joseph E. Sumerak, Blue Heron Dr., Solon, Ohio 44139

[21] Appl. No.: 370,798
[22] Filed: Jan. 10, 1995
[51] Int. Cl.⁶ ..................................... B29C 70/52
[52] U.S. Cl. .................. 156/166; 156/180; 156/311; 264/137
[58] Field of Search ..................... 156/166, 180, 156/282, 441, 181, 311; 264/136, 137, 296; 425/384, 407

[56] References Cited

U.S. PATENT DOCUMENTS

| | | | |
|---|---|---|---|
| T101,401 | 1/1982 | Zion . | |
| 2,317,597 | 4/1943 | Ford et al. | 425/407 |
| 2,874,751 | 2/1959 | Norton | 425/407 |
| 3,530,212 | 9/1970 | Kienle et al. | 156/180 |
| 3,654,028 | 4/1972 | Goldsworthy | 156/180 |
| 3,873,399 | 3/1975 | Goldsworthy et al. | 156/180 |
| 3,979,493 | 9/1976 | Cameron et al. | 264/137 |
| 4,347,287 | 8/1982 | Lewis et al. | 264/136 |
| 4,462,946 | 7/1984 | Goldsworthy et al. | 156/180 |
| 4,938,823 | 7/1990 | Balazek et al. | 156/166 |
| 5,026,447 | 6/1991 | O'Connor | 156/166 |
| 5,098,496 | 3/1992 | Breitigam et al. | 156/180 |
| 5,182,117 | 1/1993 | Ozawa et al. | 425/384 |
| 5,192,383 | 3/1993 | Cavin | 156/180 |

FOREIGN PATENT DOCUMENTS 1546764 5/1979 United Kingdom ............... 156/180

OTHER PUBLICATIONS

Martin et al, Engineered Materials Handbook: vol. 1 Composites=Pultrusion, pp. 533–543, 1987.

*Primary Examiner*—Steven D. Maki
*Attorney, Agent, or Firm*—Hudak & Shunk Co., L.P.A.

[57] ABSTRACT

A method for producing a pultrusion product having a variable cross-section using a specially adapted temperature controllable pultrusion die includes the steps of pulling reinforcing fibers which have been impregnated with a heat curable thermosetting polymeric resin composition through a temperature controllable die, heating the temperature controllable die to a temperature sufficient to effect curing of the thermosetting resin, cooling the temperature controllable die to a temperature which is sufficiently low to prevent any significant curing of thermosetting resin passing through the pultrusion die, pulling the cured material and a predetermined length of uncured material from the die, reshaping the uncured material, and curing the reshaped material. The reshaping step can be used to provide off-sets, flanges, bosses and the like. The method and associated apparatus of the invention provide a relatively simple and inexpensive way of producing fiber-reinforced thermoset plastics having a variable cross-section selected intervals along the length of the article.

17 Claims, 4 Drawing Sheets

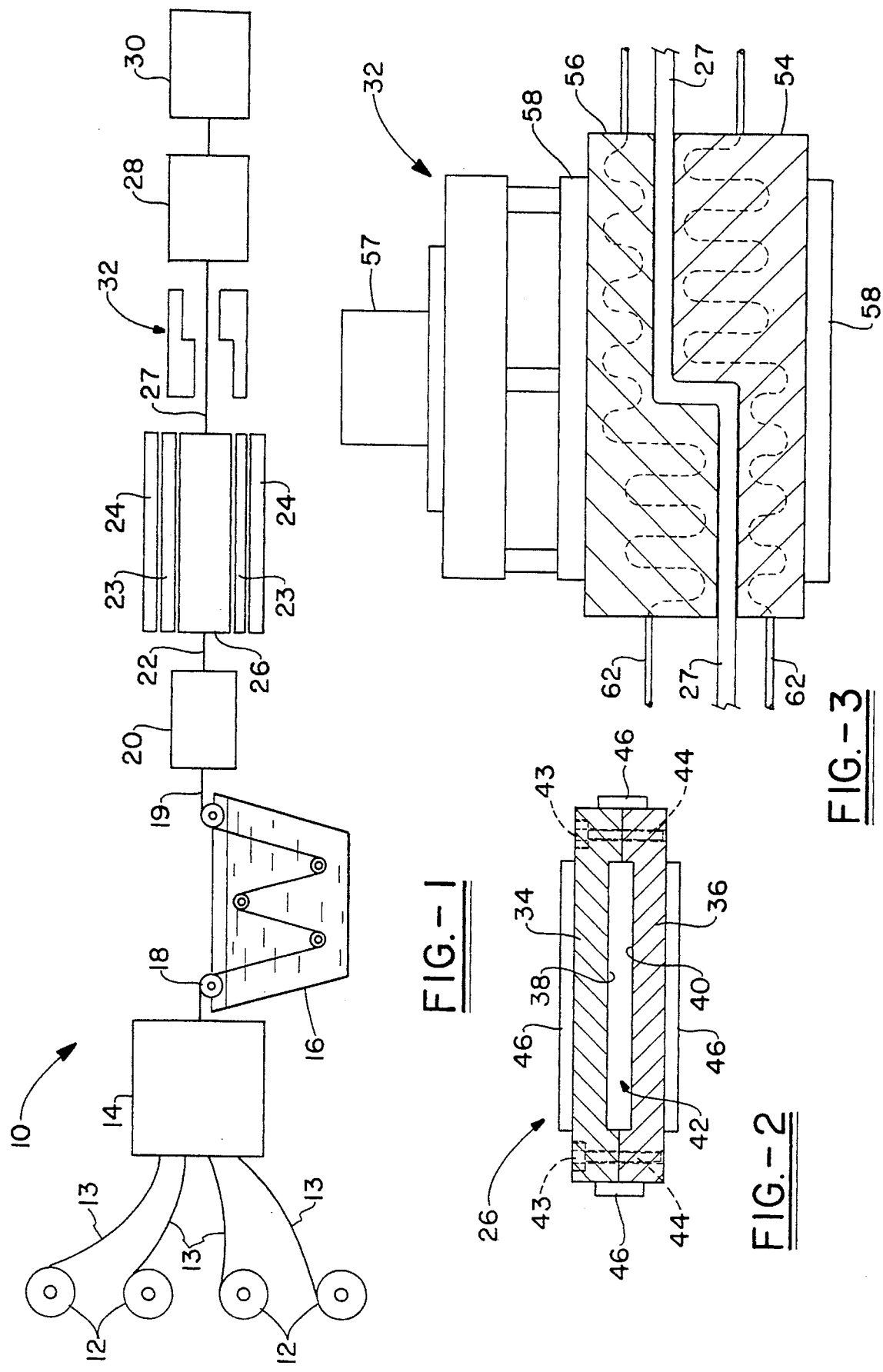

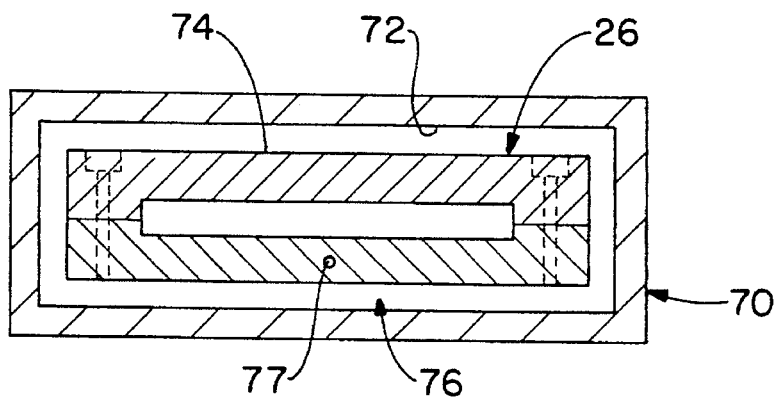
FIG.-2a
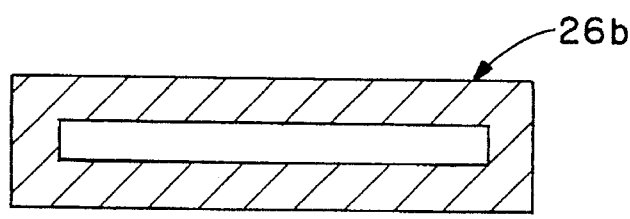
FIG.-2b
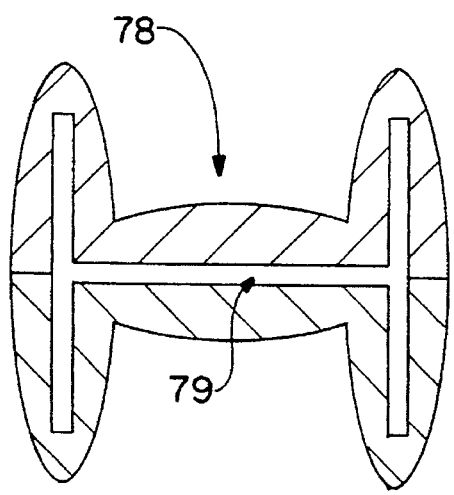
FIG.-2c
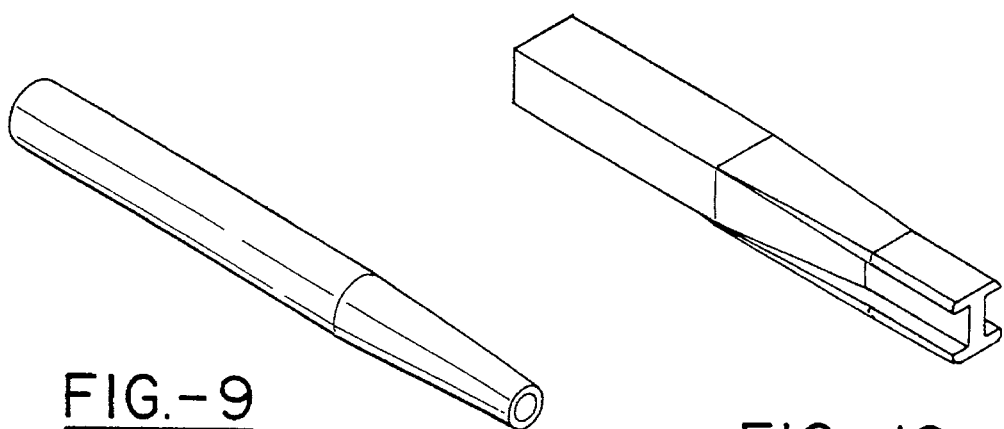
FIG.-9
FIG.-10

PULTRUSION METHOD FOR MAKING VARIABLE CROSS-SECTION THERMOSET ARTICLES

FIELD OF THE INVENTION

This invention relates to the preparation of fiber-reinforced thermoset articles, and more particularly to a pultrusion process and apparatus specially adapted for producing pultruded thermoset articles having a variable cross-section with respect to the longitudinal axis or machine direction of the pultruded article.

BACKGROUND OF THE INVENTION

Pultrusion has become recognized as one of the most efficient methods available for manufacturing fiber-reinforced engineered composite materials, especially thermoset composites. Pultruded products are especially noted for their high fiber volume content relative to products made by alternative manufacturing processes, making them particularly strong materials which are preferred in many structural applications. Commercial processes for producing pultruded thermoset articles have been generally limited to the production of products having a constant cross-section with respect to the longitudinal axis or machine direction. Thermo-plastic pultrusion technology does allow for limited geometry reshaping after primary molding, however, the cost of raw materials and secondary off-line processing steps is severely cost prohibitive for most applications. Pultrusion techniques which allow for the production of thermoset articles having a variable cross-section are desirable in order to introduce, for example, flanges, off-sets, bosses, and the like which can provide secondary structure for improved load transfer and joint efficiency.

SUMMARY OF THE INVENTION

The present invention provides an improved process for producing thermoset pultruded articles having a variable cross-sectional profile, and overcomes various disadvantages of the prior art. In particular, the process provides a practical and relatively inexpensive continuous on-line method for producing pultruded articles of variable cross-section by varying the temperature within the pultrusion die as a thermosetting resin impregnated fiber mass is pulled through the pultrusion die to provide a continuous pultruded article having at least one portion which is substantially fully cured and at least one other portion which is substantially uncured. The uncured portion is subsequently reshaped and cured to form a pultruded article having a variable cross-section. The invention provides a simpler, more cost effective process for continuously producing pultruded articles of variable cross-section which have relatively uniform fiber content and high strength characteristics. The process can also be used for integrally placing registration marks, raised letters or other insignia on the article. Furthermore, localized cross-sectional shape change can provide opportunities to selectively introduce more efficient load transfer or fastening geometries along the length of a pultruded profile. Additionally, the process is well suited to a variety of commercial applications.

The process comprises the steps of pulling a reinforcing material impregnated with a heat curable thermosetting polymeric composition through a temperature controllable pultrusion die, controlling the temperature of the pultrusion die and the drawing speed of the material so that a predetermined length of material in the pultrusion die will be substantially cured, rapidly lowering the temperature of the pultrusion die so that a predetermined length of the material passing through the pultrusion die will remain substantially uncured, reshaping the uncured portion of the material emerging from the pultrusion die, and curing the reshaped portion. Optionally, before the uncured portion of material emerging from the pultrusion die is reshaped and cured, material such as additional resin, fiber, resin impregnated fiber mass such as sheet molding compound (SMC) or bulk molding compound (BMC), metallic inserts, etc. can be added to the uncured portion and will become an integral part thereof after the reshaping and curing steps.

The uncured portions are preferably reshaped and cured immediately downstream of the pultrusion die before the pultrusion product is cut into individual articles. Alternatively, the product emerging from the pultrusion die can be cut as desired and the uncured portions can be reshaped and cured in a separate operation.

The invention is also drawn to an apparatus for forming a fiber-reinforced thermoset article having a variable cross-section, which includes means for drawing or pulling a thermosetting resin impregnating fiber mass through a die having heating means for rapidly raising the temperature of the die to effect curing and cooling means for rapidly lowering the temperature below that needed to effect curing, thereby allowing preparation of a continuous article having a substantially fully cured portion and a substantially uncured portion which can be reshaped and cured to form a fiber-reinforced article having a variable cross-section or profile. The apparatus differs from conventional pultrusion apparatus in that it is capable of controlling the level of cure at the die exit through rapid manipulation of the pultrusion die temperatures. Thus the die can be heated to cause substantial cure of thermosetting resins passing therethrough and subsequently rapidly cooled to a temperature wherein the thermosetting resin of another longitudinally aligned portion of the material passing through the die will remain substantially uncured. The apparatus further differs from conventional pultrusion apparatus in that the control of temperatures and process speed are designed for unsteady state processing rather than steady state processing and must be fully variable at any instant of time to execute variations in temperature and speed which make the process possible.

To facilitate rapid heating and rapid cooling of the die, thereby allowing commercially reasonable cycling times and production rates, the mass of the die is necessarily considerably less than that of conventional dies. More specifically, the dies preferably have relatively thin walls as compared with conventional dies, with the outer walls of the die generally conforming to the shape of the die cavity.

BRIEF DESCRIPTION OF THE DRAWINGS

FIG. 1 is a schematic illustration of an apparatus for carrying out the method of the present invention;

FIG. 2 is a cross-sectional elevation of the pultrusion die of the invention transverse to the machine direction of the apparatus;

FIG. 2a is cross-sectional elevation of a pultrusion die having a heating/cooling jacket;

FIG. 2b is a cross-sectional elevation of a single piece pultrusion die;

FIG. 2c is a cross-sectional elevation of a pultrusion die for forming an article having a H-shape cross-section;

FIG. 3 is a longitudinal cross-section of a reshaping die which can be used with the process of the invention;

FIG. 6 is a longitudinal cross-section of a pultruded product which has been pierced and reshaped using the reshaping die shown in FIGS. 5 and 5a;

FIG. 9 is a perspective view of a pultruded tubular product having a tapered end; and FIG. 10 is a perspective view of a pultruded product having a rectangular tube to an I-shaped cross-sectional transformation.

DESCRIPTION OF THE PREFERRED EMBODIMENTS

Figure 4:
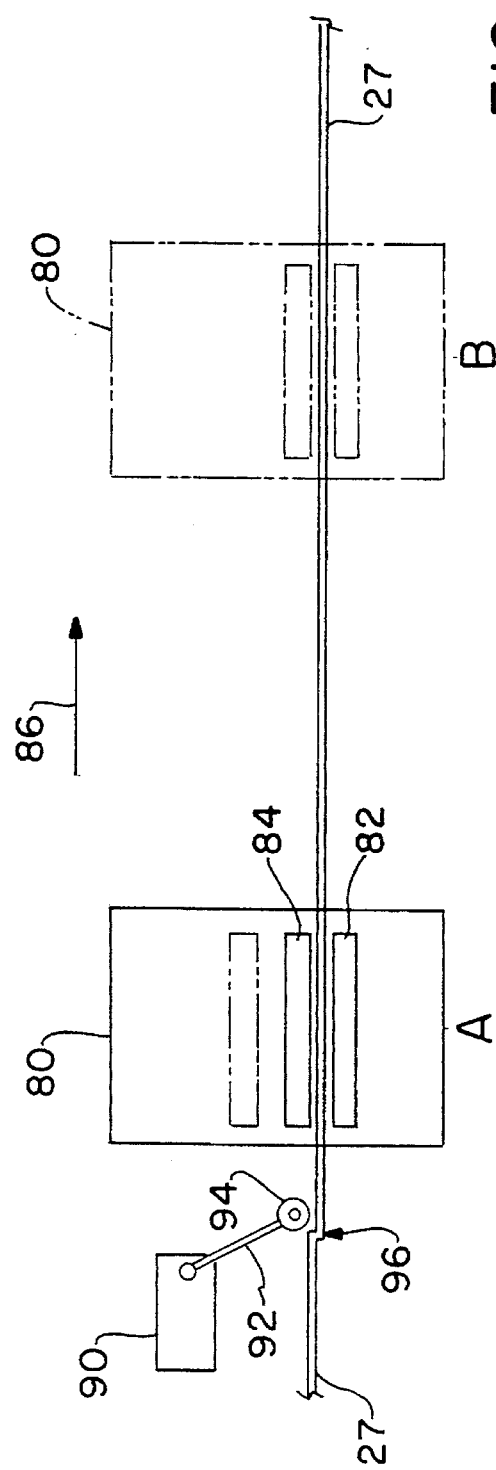
FIGS. 4 and 4a are schematic illustrations of a gripper/puller and associated means for detecting a cross-sectional change in the geometry of pultruded material to prevent the gripper/puller from clamping onto and damaging the reshaped portion of the pultruded product.

The pultrusion die used in the practice of the invention is generally similar to conventional pultrusion dies except that it is specially designed to facilitate rapid thermal cycling. In particular, the pultrusion die is provided with heating means such as electrical resistance heaters or a liquid or gaseous heat transfer fluid which can be circulated through or around the outer surfaces of the pultrusion die to rapidly raise the temperature of at least a portion of the pultrusion die above the temperature needed to effect curing of the heat curable thermosetting polymeric material, and cooling means such as a liquid or gaseous heat transfer fluid which can be circulated through or around the outer surfaces of the pultrusion die to rapidly lower the temperature of the pultrusion die below that temperature wherein appreciable curing of the heat curable thermosetting polymeric material can occur. Preferably the heating and cooling means each extend substantially the entire length of the die along the direction through which the pultruded material is drawn so that the temperature of substantially the entire die can be raised above that needed to cause curing of the thermosetting resin and lowered to a temperature sufficiently low to inhibit curing of the thermosetting resin. The wall thickness of the pultrusion die is preferably relatively thin as compared with conventional pultrusion dies to reduce the amount of heat transfer needed to achieve a desired temperature change of the pultrusion die. More specifically, the wall thicknesses of the pultrusion die are minimum in order to reduce thermal mass and yet provide the mechanical optimized properties necessary to withstand the forces which arise within the pultrusion die due to the frictional resistances and thermal expansion of the liquid, gel and solid regions of the material passing along the internal walls of the pultrusion die.

The invention allows production of pultruded articles of generally any desired length of constant cross-section having a localized variable cross-section shape introduced at any axial location along the product length and having uniform high fiber content and uniform fiber to resin bonding characteristics throughout. By contrast, known processes for producing variable cross-section pultruded products have generally involved the use of steady state pultrusion curing techniques utilizing one or a plurality of identical heated variable cross-section dies which close upon a moving stream of resin impregnated fiberous material to which additional thermosetting material may be added. The heated die or dies remain closed as the material cures while moving downstream. When the material has cured the die is opened and returned or cycled back upstream in the process. The articles produced by these known processes generally have an identical cross-sectional repeat sequence defined by the length of the molding die or dies along the length of the continuous process stream. An example of such a process is hammer handle blanks which are of relatively short length. Other proposed methods for producing pultruded products having a variable cross-section shape and relatively uniform fiber content and uniform fiber to matrix bonding have not yet been proven to be successful and/or have been limited to polymerizable compositions capable of achieving a B-staged low level of cure, such as epoxy resins, which require storage of material at reduced temperatures until subsequent reshaping and cure is undertaken.

An embodiment of the invention will now be described with respect to a pultrusion apparatus for pultrusion a sheet or strip having a generally rectangular shape cross-section. It should be understood, however, that the invention is applicable to molding of articles having generally any desired shape, including tubes and rods having square, circular, rectangular trapezoidal, X-shaped, T-shaped, J-shaped, I-shaped or other regular or irregular cross-sectional shape or profile. Cross-sectional shape or profile as used herein, unless otherwise noted, refers to the shape of the pultruded article in a cross-section which is viewed along a line coincident or parallel with the direction from which the pultruded article emerges from the pultrusion die, i.e. the shape of a cross-section which is perpendicular with the machine direction.

Referring to FIG. 1, a pultrusion apparatus is generally designated by the numeral 10. The apparatus includes a plurality of creels or spools 12 from which reinforcing fibers 13 are supplied and drawn through guide 14 which guides and converges the reinforcing fibers which are pulled through resin bath 16. The reinforcing fibers 13 are passed around several redirect bars 18 which cause spreading of the fibers in the bath and provide for thorough impregnation of each of the fibers with a liquid heat curable thermosetting resin contained within the resin bath 16. Various alternative techniques which are well known to the art can be employed to apply or impregnate the fibers 13 with thermosetting resin. Such techniques include, but are not limited to, spraying, dipping, roll coating, brushing and the like. Alternatively, preimpregnated fibers can also be used. Other known techniques which can be employed to impregnate the fibers with thermosetting resin include pressure assisted impregnation which is also often referred to as resin injection. The resin impregnated reinforcing fibers 19 emerging from resin bath 16 are pulled through a forming guide system 20 which, for example, can be comprised of one or a plurality of machined plates, sheet metal guides or like, which consolidates the resin impregnated fibers 19 into the approximate shape of the desired pultruded article. The consolidated mass of resin impregnated fibers 22 emerging from the forming guide system 20 is pulled through a temperature controllable pultrusion die 26 which is capable of undergoing rapid temperature cycling and passes to a gripping/pulling means 28. Heating means 23 and cooling means 24 are provided to selectively heat and cool the die 26 as required so that a first portion (i.e. length) of the material 27 emerging from the die is substantially fully cured and a second longitudinally aligned portion (i.e. length) is substantially uncured. It should be understood that the heating means 23 and cooling means 24 are preferably comprised of a plurality of individually controllable heating and cooling means respectively to facilitate optimal temperature control along the entire length of the die (for example, to achieve an optimal cure profile and to subsequently cool it). The substantially uncured portion of the material emerging from die 26 is reshaped and cured by reshaping die 32. After passing through the pulling means 28, the composite 24 is cut into articles of desired length by a cutting means 30 which can be generally any known means suitable for cutting thermoset articles such as a circular saw, band saw or the like.

Conventional pultrusion processes are generally operated at steady state conditions, i.e. temperature and other process parameters generally remain relatively constant at any location in the process stream. The present invention involves an unsteady state process wherein the temperature in the pultrusion die 26 alternates between temperatures at or above the temperature needed to effect polymerization reactions and curing of the heat curable thermosetting polymeric resin, and temperatures which are sufficiently low to prevent or retard any significant reaction or curing of the heat curable thermosetting resin composition.

A cross-sectional elevation transverse to the machine direction (i.e. the direction that the thermosetting resin impregnated fiberous mass is moving) of the temperature controllable pultrusion die is shown in FIG. 2. The pultrusion die 26 includes an upper die part 34 and a lower die part 36 having recessed areas 38 and 40 respectively which together define a die cavity 42. The upper die part 34 and lower die part 36 are preferably held together such as by socket head cap screws 43 which pass through upper die part 34 and are secured to lower die part 36 through a corresponding threaded bore 44 in lower die part 36, although other means such as clamps can be used to hold the die parts together. Alternatively, a die 26b (shown in FIG. 2b) having a single piece construction with a predefined closed cavity can be employed, such as seamless tube dies or dies produced using the wire EDM process, which eliminate the need for fasteners. The pultrusion die includes heating means such as an electrical heater resistance strip 46. Alternatively, other conventional heating means can be provided such as external platen heaters, infrared heaters, cartridge heaters, quartz heaters, conduits or channels provided in the die parts for circulating a heated fluid, and the like. Sufficient heating means 46 are provided so that the temperature of substantially the entire pultrusion die 26 can be rapidly heated to a desired axial temperature profile suitable for continuous steady state pultrusion processing.

Conventional pultrusion dies are provided with heating means for maintaining a heating zone at a relatively constant temperature sufficient to effect curing of the thermosetting resin passing through the die cavity, but are not provided with cooling means for lowering the temperature within the heating zone below that necessary to effect curing, although conventional pultrusion dies often which include a cooling zone with associated cooling means at the entrance of the die to avoid curing in the tapered or radiused entrance region. Cooling means may be included at the exit end of the die to suppress the temperature of the already cured material to avoid thermal stress cracking which may occur as the hot material exits the die.

By contrast, the pultrusion die 26 of the present invention also includes cooling means capable of rapidly absorbing heat from the pultrusion die 26 so that the temperature at the mold cavity surfaces 38 and 40 can be rapidly lowered, e.g. less than 3 minutes and desirably less than 1 minute, to a temperature below that wherein appreciable curing of the heat curable thermosetting resin can occur. Unlike conventional pultrusion dies which are either devoid of cooling means or include cooling means only at localized cooling zones at the entrance and/or exit of the die, the pultrusion die of the present invention is provided with heating and cooling means capable of achieving rapid thermal cycling so as to abstract heat from heated die areas which could otherwise initiate cure. Suitable cooling means include any conventional means known to the art for directly or indirectly cooling the die. Such cooling means include fans, blowers, or the like for moving cool air or other cool gases past the outer surfaces of the pultrusion die to effect rapid convective cooling. Another suitable means for rapidly cooling the pultrusion die is with cooling coils which are embedded within or otherwise in thermally conductive contact with the pultrusion die, and through which a cool fluid is circulated. As another alternative, the pultrusion die 26 can be provided with a combination heating/cooling jacket 70 which completely surrounds the pultrusion die, as shown in FIG. 2a. The inner walls 72 of the jacket 70 are spaced from the outer walls 74 of the pultrusion die to provide a space 76 therebetween through which cooling and heating fluids can be alternately circulated to cool and heat the pultrusion die 26 as desired. A plurality of thermocouples 77 can be provided at selected locations within the pultrusion die 26 as desired for automated temperature control.

In order to facilitate rapid thermal cycling of the temperature controllable pultrusion die 26, the pultrusion die parts 34 and 36 preferably have relatively thin walls to reduce the amount of heat which must be added or removed by the heating and cooling means respectively in order to achieve the temperature changes required to effect and prevent curing of the thermosetting resin respectively. Of course, the mechanical and thermal properties of the die material will effect the thermal mass. As an example, copper base tooling alloys can be used for the die as compared to P20 grade tool steel. Suitable wall thicknesses, i.e. the shortest distances between the internal walls 38 and 40 and the external walls 74 of the pultrusion die, are desirably less than ½ inch and preferably less than or about ¼ inch. Most preferably the wall thicknesses of the pultrusion die parts are the minimum wall thickness required to provide the structural strength necessary to constrain forces imposed upon the die by the material passing therethrough. More specifically the thickness of the pultrusion die walls is preferably about the minimum needed to limit deformation of the die wall to a tolerable level which will not interfere with successful processing of the material passing through the pultrusion die. A suitable die wall thickness is generally one wherein the cavity deformation does not exceed 0.002 inches when subjected to internal pressures which are typically imposed on the pultrusion die. Internal pressures imposed in the pultrusion die can generally range from about 50 to 500 psi, and more typically up to about 200 psi. Suitable wall thicknesses can be determined experimentally, but are more preferably estimated using mathematical modeling techniques such as finite element analysis. It has been determined that the mass of the pultrusion die can generally be reduced to about 10 to about 20 percent of the mass of conventional pultrusion dies which are not subjected to rapid temperature cycling. The length of the pultrusion die is generally from about 12 to 96 inches, and more typically from about 30 to about 60 inches. In order to achieve a low mass die which can be easily heated to a temperature which will cure thermosetting resin passing therethrough and easily cooled to temperatures below that where curing occurs, the cross-sectional shape of the outer walls most generally conform to the shape of the die cavity so that the thickness of the die walls are generally less than about ¼ inch around the entire cross-sectional perimeter. For example, in accordance with the principles of the invention, in order to reduce die mass and permit rapid temperature cycling of the die, the outer cross-sectional perimeter of a die 78 having a die cavity 79 with an H-shaped cross-section would also have a substantially conforming H-shape such as shown in FIG. 2c. This differs substantially from conventional pultrusion dies which are generally massive to provide for better thermal stability and wherein the outer cross-sectional perimeter of the die is generally rectangular regardless of the shape of the die cavity.

The pultrusion apparatus of the invention preferably includes a reshaping die 32 which is positioned immediately downstream of the temperature controllable pultrusion die 26. A matched metal mold (i.e. compression mold) reshaping die 32 which is suitable for producing a simple offset is shown in FIG. 3. The reshaping die 32 is comprised of a lower die part 54 and an upper die part 56 which can be separated from each other by a predetermined distance sufficient to permit composite product 27 emerging from pultrusion die 26 to freely pass therebetween, and which can be brought together and urged upon uncured portions of product 27 to reshape the same. The die parts 54 and 56 can be brought together to reshape portions of the pultruded product 27 or retracted by any of various means such as pneumatic or hydraulic cylinder means 57 to which a hydraulic or pneumatic fluid is supplied. Alternate means such as mechanical jack screws or scissors mechanisms can be employed. The reshaping die 32 includes heating means such as electrical resistance strip heaters 58 and cooling means such as cooling coils 62 (schematically illustrated in FIG. 3) Any of various alternative conventional heating and cooling means known to the art may be provided to heat the reshaping die to a temperature which is sufficient to effect curing of the thermosetting resin of an uncured portion of pultruded product 27 emerging from pultrusion die 26 and thereafter cool the reshaping die to a temperature below that which will cause significant curing. It is preferable that the reshaping die include cooling means in order to avoid surface precure when the uncured portion is drawn between the open reshaping mold parts.

The process of the present invention differs from conventional pultrusion processes by operating under non-steady-state conditions so that selected portions of the composite product 27 emerging from the pultrusion die are substantially uncured, while other portions, generally the majority of the composite 27, are substantially fully cured. The expression "substantially uncured portion" as used herein refers to a portion of material which has emerged from the pultrusion die and which can be reshaped such as by pressure molding and cured to form a rigid solid which cannot be again reshaped by pressure molding. To retard or prevent cure during the cooling cycle, preferably the die temperature is lowered to below the initiation temperature of the resin, i.e. to the temperature which results in less than 5% reaction but more preferably less than 3% and even no reaction proceeding during the advance of the uncured material through the cooled die to the reshaping die.

The expression "substantially fully cured portion" as used herein refers to a portion of material which has emerged from the pultrusion die which has cured sufficiently such that it is a rigid solid which cannot be reshaped by pressure molding. Typically, these portions will have at least about 80%, preferably 90% and most preferably 95% by weight of polymers and reacted monomers in the form of a cross-linked thermoset.

To affect cure of the thermosetting material, preferably the pultrusion die 26 has a ramped or zoned temperature profile which can be exemplified for peroxide initiated polyester or vinyl ester resins as having an entrance temperature maintained at about 20° F. below the reaction initiation temperature, an increasing temperature ramp zone extending over about 18 inches with a maximum temperature of about 300° F. to 375° F., and an optional decreasing temperature zone comprising the remaining die length wherein the minimum temperature of the zone is determined by the appearance or integrity of the cured composite. In practice the die exit temperature is within about 50° F. to 100° F. of the die maximum temperature. For epoxy resins, a generally hotter die profile is utilized with an entrance temperature of 200° F. and a die maximum temperature of 400° F. to 450° F. With all of the subject resins, the extent of reaction (or cure) will depend on the temperature as well as the residence time in the die. For example, a certain thermal profile of a die may achieve 95% reaction at one speed and only 80% reaction at a faster line speed (yielding higher production speed but lowered physical properties).

Figure 4A:
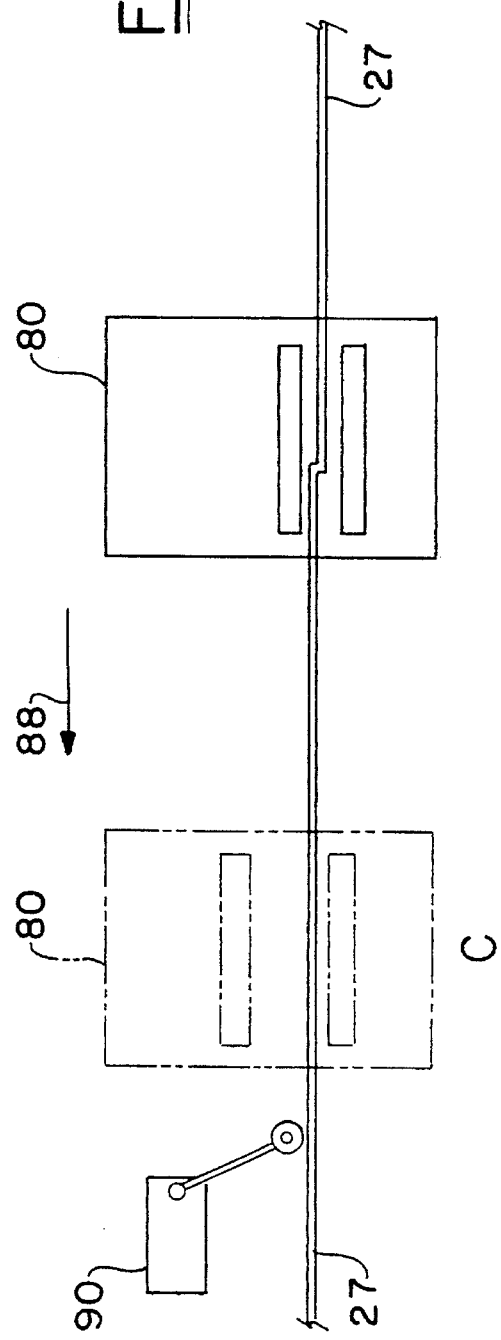

During start up, the reinforcing fibers can be drawn by hand through guide 14, resin bath 16, forming guides 22, pultrusion die 26 and freely between spaced die parts 54 and 56 of reshaping die 32 to gripping/pulling means 28. After the temperature within at least a portion of the pultrusion die 26 is raised to a temperature sufficient to effect curing of the heat curable thermosetting resin composition, the material 27 is engaged by the gripping/pulling means 28 which can be any conventional means known for continuously drawing pultruded material through a pultrusion die. The gripping/pulling means must generally be regulated to avoid damage to any reshaped portion having a cross-section which is different from that of material emerging from the pultrusion die 26. Specifically, means should be provided to sense any reshaped portions and avoid engagement of the gripping/pulling means with the reshaped portions to prevent damage to the pultruded product. Particularly preferred gripping/pulling means include conventional reciprocating clamp type pullers 80, as shown in FIGS. 4 and 4a, which are used in association with means for sensing and avoiding clamping onto the reshaped portions of the pultruded products.

The reciprocating clamp type puller 80 includes a lower gripper 82 which is stationary relative to the frame of the puller 80, and an upper gripper 84 which is vertically movable between an unclamped position (shown in phantom) and a clamped position (shown in solid lines). Alternatively, a stationary upper clamp and movable lower clamp design may be employed. When the upper gripper 84 is in the clamped position the pultruded product is firmly held or gripped between the upper and lower grippers. The entire reciprocating clamp type puller 80 is movable in the machine direction (indicated by arrow 86) to pull the pultruded material through the pultrusion apparatus when the upper gripper is in the clamped position. A similar or identical reciprocating gripper/puller mechanism is preferably situated directly after the first gripper/puller means such that with alternating cycles the product being pulled through the pultrusion die experiences an essentially continuous motion. After the puller 80 has pulled material 27 a predetermined distance through the apparatus, such as from position A to position B (as shown in FIG. 4), gripper 84 is raised to the unclamped position and puller 80 is moved backwards in a direction opposite to the machine direction (as indicated by arrow 88 in FIG. 4a) to a position C where the gripper 84 can be lowered back into the clamped position to pull more material 27 in the machine direction. The puller 80 is preferably used in association with a detector means 90 which includes a rotatable lever 92 and a follower wheel 94 which rolls along the surface of the material 27 as it is being pulled through the pultrusion apparatus. When a portion of the material 27 having a reshaped portion, such as an offset 96, passes by the wheel 94, lever 92 rotates slightly activating a switch in detector means 90 to record the position of the offset 96 so that puller 80 is instructed to avoid clamping onto that position. Alternatively, any non-contact sensing device including but not limited to ultrasonic, capacitive, or photoelectric means may be utilized to sense and define the position of cross-sectional changes to be avoided by the clamping device. A predetermined length of cured composite material 27 can be pulled from pultrusion die 26, at a line speed of from about 1 to about 180 inches per minute, or more typically from about 12 to about 72 inches per minute.

After the desired length of substantially fully cured composite has been prepared, the temperature in the pultrusion die 26 is rapidly reduced, such as by exposing the outer surfaces of the pultrusion die to a cooling fluid (liquid or gas) under turbulent flow conditions to provide adequate convective heat transfer, to cool the inner die surfaces 38 and 40 to a temperature at which curing of the thermosetting resin does not occur at an appreciable rate. It is generally desirable to draw material 22 into the pultrusion die at a very slow rate, or more preferably discontinue pulling material into the die 26 while it is being cooled in order to provide a sharp transition between the cured and uncured portions of the material 27 emerging from the die 26. It is generally possible to achieve a transition from substantially fully cured to substantially uncured material which is less than 1 or 2 inches. After the die 26 is cooled to a temperature which is sufficiently low to prevent any significant curing of the thermosetting material residing therein, a predetermined length of substantially uncured composite is pulled through the die 26. After the desired length of substantially uncured material has been drawn from the die 26, the die is reheated to a temperature which will cause the thermosetting material entering the die 26 to cure. This process of periodic cooling of the pultrusion die, drawing of uncured material from the die 26, reheating of the pultrusion die, and drawing of cured material from die 26 can be repeated as desired to produce a plurality of pultruded products having cured portions and uncured portions. Cutting means 30 are used to cut the pultruded composite 27 into individual articles.

The process and apparatus of the invention generally allows any desired length of substantially fully cured material to be drawn from the pultrusion die followed by generally any desired length of substantially uncured material which can be reshaped and cured to form various fiber-reinforced thermoset articles having variable cross-sectional geometries. The material exiting the pultrusion die can generally have any combination of uncured linear segments and cured linear segments. The apparatus can be manually controlled, but it is generally preferable that the apparatus be computer controlled, especially when the length of the cured and/or uncured portions of material leaving the pultrusion die 26 is to be varied from one product to the next.

Figure 5:
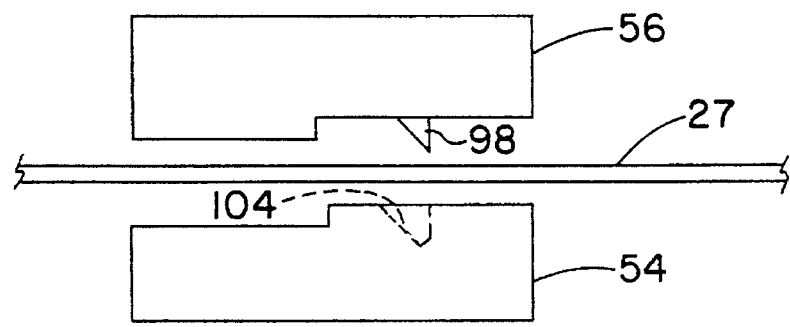
FIGS. 5 and 5a are longitudinal cross-sections of a reshaping die having means for piercing and selectively shearing fibers of pultruded material during reshaping of uncured portions thereof.
Figure 5A:
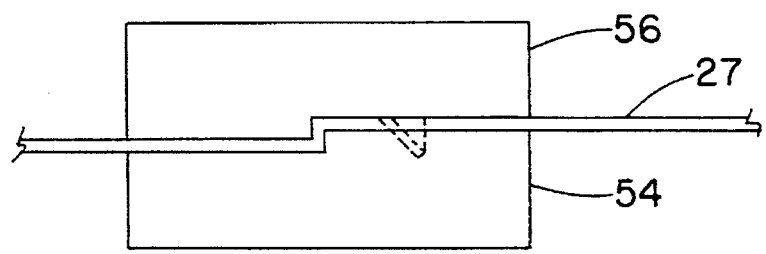
Figure 6:
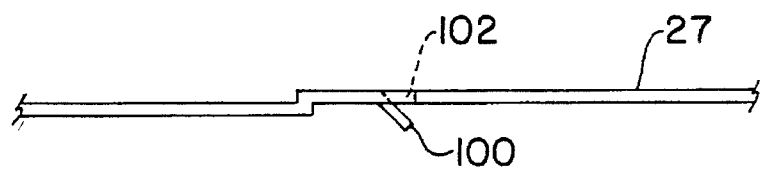
Figure 6A:
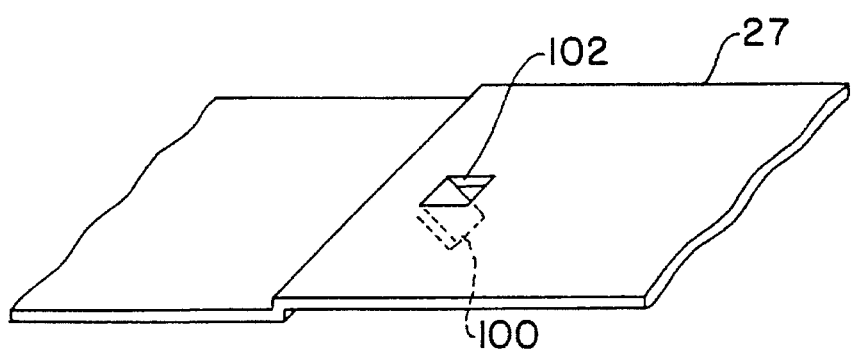
FIG. 6a is a perspective view of the product shown in FIG. 6.

The uncured portions of the composite 27 emerging from pultrusion die 26 are preferably reshaped in-line immediately downstream of the pultrusion die by means of a compression or reshaping die 32 having heating means 58 to allow for in-line reshaping and curing of the uncured portions of composite 27. The reshaping die 32 is preferably positioned immediately adjacent to the pultrusion die so that the uncured portion of material emerging from die 26 can be reshaped and cured before significant amounts of monomers or other volatile materials in the thermosetting resin composition evaporate. The reshaping die 32 can be either stationary or movable along a linear path generally in line with the axial or machine direction of the pultrusion die, in which case the reshaping die 32 can also serve as an auxiliary gripping/pulling device. Alternatively, the uncured portions of the composite 27 emerging from pultrusion die 26 can be reshaped at a separate molding station after being cut into individual articles. The reshaping die 32 may incorporate a provision to pierce and/or selectively shear fibers during the closure of the die which allows local reshaping beyond the normal elongation limits of the reinforcing fibers. Such a feature would allow for integrally molded holes and tabs normally requiring secondary fabrication steps. For example, upper die part 56 can be provided with a piercing protrusion 98 (as shown in FIG. 5) which cuts through material 27 when die parts 54 and 56 are drawn together (as shown in FIG. 5a) to reshape a portion of material 27. Die part 54 is provided with a recess which generally conforms to the piercing protrusion 98 and cooperates therewith to form a projecting tab 100 (shown in FIGS. 6 and 6a) and slot 102.

Figure 7:
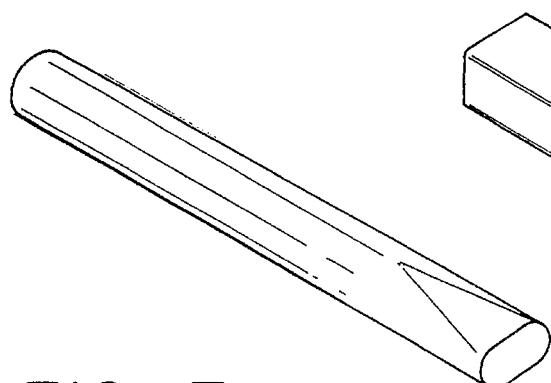
FIG. 7 is a perspective view of a pultruded rod with an end portion which transitions from a circular to an oval cross-section.

The present invention has been illustrated by reference to a simple example wherein a sheet or strip is provided with an off-set, however it should be understood that the die 32 can be configured to provide a variety of different shapes such as transverse ribs, transverse flanges, transverse bosses or protrusions, and the like. Resin, fibers, inserts and or other materials can be added to the uncured portions of material exiting curing die 26 and integrally bonded thereto during the reshaping and curing steps. The ribs, flanges, bosses and the like can be utilized to facilitate better mechanical joints which provide for more effective transfer of mechanical loads from the pultruded article to another structure. For example, the off-set sheet or strip bar product which is illustrated above can be used to provide a superior lap joint wherein longitudinal compressive loads can be transferred from one pultruded member to another. Another example wherein the invention can be effectively utilized is in the fabrication of C-channel troughs. In accordance with the method of the invention, such C-channel troughs can be provided at one end with an offset channel designed to receive the unmodified end of a similar C-channel trough providing an overlap butt joint which need only be sealed at one end, thereby reducing the labor needed to join trough members together. Another example is the termination of oil well sucker rods. Current rod terminations utilize metal fittings which are adhesively bonded to a constant cross-section rod in a manner which promotes rod tensile failures rather than interface failures. This approach requires a fairly massive fitting which adds to the sucker rod string weight. As an alternative, the method of the invention can be used to provide a modified geometry at the end of the rod which allows a mechanical support which fully utilizes the tensile load of the rod without the risk of damaging the composite structure. For example, the process of the invention can be used to make an oil well sucker rod with an end portion which transitions from a circular to an oval cross-section (as shown in FIG. 7) which allows use of the geometric change to mechanically transfer load from a fitting to the rod without relying entirely upon an adhesive interface.

Figure 8:
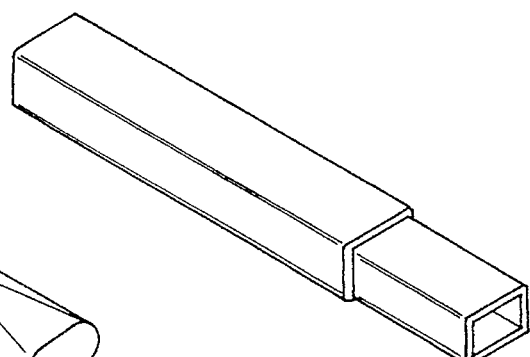
FIG. 8 is a perspective view of a pultruded tubular product having a reshaped reduced outer cross-sectional perimeter at one end which conforms to the inner perimeter of the remaining portions of the product.

The invention is also useful for preparing tubular products (such as shown in FIG. 8) having a reshaped reduced outer cross-sectional perimeter at one end which conforms to the inner perimeter of the remaining portions of the tubular product which emerged from the pultrusion die fully cured. Such products can be joined together more easily by inserting the reshaped end of one tube to the unmodified end of a similar product, and will facilitate better load transfer and joining without the need for internal connecting plugs or external sleeves. In a similar manner, tubular reducing tapers (such as shown in FIG. 9) may be introduced at the end of a substantial length of constant cross-section profile. Virtually any cross-sectional transformation can be accommodated by proper design of the reshaping means with consideration for the limits of fibrous material displacement. For example, the process and apparatus of the invention can be used to produce pultruded products having a shape transformation such as from a rectangular tube to a I-shape cross-section (as shown in FIG. 10).

Generally, any of the various known heat curable thermosetting polymeric resin compositions such as those based upon unsaturated polyesters, vinyl esters and epoxies can be utilized with the invention. Other suitable resins include heat curable thermosetting methacrylate resins, modified phenolic resins, bismaleimide resins, and the like. In particular the process and apparatus is not limited to addition polymerization thermosetting compositions, but instead may employ generally any known thermosetting composition. Such compositions can include conventional amounts of reactive prepolymers, oligomers, or monomers; fillers; pigments; mold release agents; flame retardants; low profile agents; catalysts; inhibitors; air release agents; impact modifiers; and the like. Such heat curable thermosetting resin compositions are well known to the art of plastic molding and more particularly to the art of pultrusion.

As used herein, "reinforcing fibers" includes filaments, yarn, roving, mats, felt, ribbon, tape, fabric and the like in continuous form, usually aligned parallel to the flow of material and including stitched or braided fibers. Any combination of continuous reinforcements can generally be used. The number and arrangement of the fibers used in the process of the invention will vary according to the particular cross-sectional shape of the article being formed and can readily be determined by a person skilled in the art of pultrusion. Usually, the fiber content of the pultruded product 27 is from about 25 to about 80 weight percent based on the total weight of the composite material.

The fibrous reinforcing material can be any conventional material suitable for reinforcing means, including metal fibers, glass fibers, carbon fibers (graphite), boron fibers, ceramic fibers, Kevlar® fibers, synthetic organic fibers such as polyamide and polyethylene fibers, and various other inorganic or organic fiberous materials known to be useful for reinforcing thermosetting polymeric compositions, such as cellulose, asbestos, cotton and the like.

While the invention has been described with reference to the preferred embodiment wherein dry reinforcing fibers are directed through a resin bath and impregnated with the heat curable thermosetting resin composition contained within the bath, it should be understood that preimpregnated reinforcing fibers (i.e. prepreg tapes and the like) can be utilized with the invention. In such case, the heat curable thermosetting resin preimpregnated reinforcing fiber material is generally refrigerated prior to use. Where preimpregnated reinforcing fibers are used, such preimpregnated reinforcing fibers are drawn directly into the forming die 22, and the guide 14 and resin bath 16 can be eliminated from the process.

While in accordance with the patent statutes the best mode and preferred embodiment has been set forth, the scope of the invention is not limited thereto, but rather by the scope of the attached claims.

What is claimed is:

1. A method for preparing a fiber-reinforced thermoset article, comprising:

a) heating at least a portion of a die to a first temperature which is sufficiently high to cause a heat curable thermosetting resin composition to cure;

b) pulling a first portion of a continuous material comprised of reinforcing fibers which are impregnated with said heat curable thermosetting resin composition through said heated die to substantially cure the resin of said first portion thereby forming a substantially cured first portion; and c) cooling at least said portion of said die from said first temperature to a second temperature, said second temperature being sufficiently low to prevent said heat curable thermosetting resin composition from curing, wherein the continuous material is pulled into the die at a very slow rate or pulling of the continuous material into the die is discontinued while the die is being cooled;

d) pulling a second portion of said continuous material through and out of said cooled die to provide a substantially uncured second portion and a sharp transition between the substantially uncured second portion and the substantially cured first portion;

e) reshaping said substantially uncured second portion; and f) curing the second reshaped portion.

2. The method of claim 1, further comprising repeating steps a) through f).

3. The method of claim 1, further comprising the step of incorporating additional material to said substantially uncured second portion before reshaping, said additional material becoming an integral part of said article after curing said second reshaped portion.

4. The method of claim 3, wherein said additional material is one or more of thermosetting resin, reinforcing fiber, reinforcing fiber impregnated with thermosetting resin, and metal inserts.

5. The method of claim 1, wherein said reshaping and curing of said reshaped portion are performed in a pressure molding apparatus downstream of said die.

6. The method of claim 5, wherein said pressure molding apparatus is adjacent to an end of said die from which said continuous material exits.

7. A pultrusion method as set forth in claim 1, wherein said continuous material is continuous along its longitudinal axis and wherein said material is stationary along its longitudinal axis during said cooling step.

8. A pultrusion method for preparing a fiber-rain-forced thermoset article, comprising:

a) heating at least a portion of a low thermal mass pultrusion die to a first temperature which is sufficiently high to cause a heat curable thermosetting resin composition to cure;

b) pulling a first portion of a continuous material comprised of reinforcing fibers which are impregnated with said heat curable thermosetting resin composition through said heated die to substantially cure the resin of said first portion thereby forming a substantially cured first portion; and c) cooling at least said portion of said die from said first temperature to a second temperature, said second temperature being sufficiently low to prevent said heat curable thermosetting resin composition from curing, wherein the continuous material is pulled into the die at a very slow rate or pulling of the continuous material into the die is discontinued while the die is being cooled;

d) pulling a second portion of said continuous material through and out of said cooled die to provide a substantially uncured second portion and a sharp transition between the substantially uncured second portion and the substantially cured first portion;

e) reshaping said substantially uncured second portion; and f) curing the second reshaped portion.

9. A pultrusion method as set forth in claim 8, wherein said pultrusion die has an internal cavity defining mold surfaces and wherein the temperature of said mold surfaces are cooled to a temperature below an initiation cure temperature of said resin in less than three minutes.

10. A pultrusion method as set forth in claim 9, wherein said mold surfaces are cooled below the initiation cure temperature of said resin in less than one minute.

11. A pultrusion method as set forth in claim 10, wherein said second portion is reshaped and cured in a compression mold.

12. A pultrusion method as set forth in claim 11, wherein additional material is added to said uncured second portion before reshaping and curing said second portion.

13. A pultrusion method as set forth in claim 8, wherein at least about 80 percent of said resin of said substantially cured first portion is a cross-linked thermoset, and wherein less than about 5 percent of said resin of said substantially uncured second portion is in the form of a crosslinked thermoset.

14. The pultrusion method as set forth in claim 13, wherein the transition from said substantially fully cured to said substantially uncured material is less than two inches.

15. A pultrusion method as set forth in claim 14, wherein a reshaping die is used to reshape and cure said second uncured portion.

16. A pultrusion method as set forth in claim 15, wherein said reshaping die is used to pull said material along its longitudinal axis.

17. A pultrusion method as set forth in claim 16, wherein said resin comprises one or more of unsaturated polyesters, vinyl esters, epoxies, methacrylate resins, modified phenolic resins, and (bis)maleimide, and said reinforcing fibers comprise one or more of metal fibers, glass fibers, carbon fibers, boron fibers, ceramic fibers, synthetic organic fibers, and natural organic fibers.

* * * * *